(12) United States Patent
Cho et al.

(10) Patent No.: US 7,634,173 B2
(45) Date of Patent: *Dec. 15, 2009

(54) RECORDING MEDIUM HAVING DATA STRUCTURE FOR MANAGING REPRODUCTION OF AT LEAST VIDEO DATA REPRESENTING MULTIPLE REPRODUCTION PATHS AND RECORDING AND REPRODUCING METHODS AND APPARATUSES

(75) Inventors: Jang Hui Cho, Seoul (KR); Jea Yong Yoo, Seoul (KR); Kang Soo Seo, Kyunggi-do (KR); Byung Jin Kim, Kyunggi-do (KR)

(73) Assignee: LG Electronics Inc., Seoul (KR)

( * ) Notice: Subject to any disclaimer, the term of this patent is extended or adjusted under 35 U.S.C. 154(b) by 220 days.

This patent is subject to a terminal disclaimer.

(21) Appl. No.: 10/810,635

(22) Filed: Mar. 29, 2004

(65) Prior Publication Data
US 2004/0179819 A1    Sep. 16, 2004

Related U.S. Application Data

(63) Continuation of application No. 10/201,454, filed on Jul. 23, 2002.

(30) Foreign Application Priority Data
Jul. 24, 2001    (KR) ............................... 2001-44387

(51) Int. Cl.
*H04N 7/52*    (2006.01)

(52) U.S. Cl. ............................. 386/95; 386/36; 386/37; 386/124; 386/92; 386/125; 386/126

(58) Field of Classification Search ................... 386/95, 386/124–126, 36–37, 92
See application file for complete search history.

(56) References Cited

U.S. PATENT DOCUMENTS

| | | | |
|---|---|---|---|
| 5,521,898 A | 5/1996 | Ogasawara | |
| 5,559,808 A | 9/1996 | Kostreski et al. | |
| 5,602,956 A | 2/1997 | Suzuki et al. | |
| 5,651,010 A | 7/1997 | Kostreski et al. | |
| 5,729,549 A | 3/1998 | Kostreski et al. | |
| 5,732,185 A | 3/1998 | Hirayama et al. | |
| 5,742,569 A * | 4/1998 | Yamamoto et al. | ....... 369/30.18 |

(Continued)

FOREIGN PATENT DOCUMENTS

CN    1134583    10/1996

(Continued)

OTHER PUBLICATIONS

Chinese Office Action dated Dec. 14, 2007.

(Continued)

*Primary Examiner*—Thai Tran
*Assistant Examiner*—Helen Shibru
(74) *Attorney, Agent, or Firm*—Harness, Dickey & Pierce, PLC (57) ABSTRACT

In the data structure, a data area of the recording medium stores at least video data as a transport stream in more than one file. Each file is associated with a different one of the multiple reproduction paths, and the files are interleaved with one another.

29 Claims, 8 Drawing Sheets

U.S. PATENT DOCUMENTS

| | | | |
|---|---|---|---|
| 5,747,136 A | 5/1998 | Shono et al. | |
| 5,771,334 A | 6/1998 | Yamauchi et al. | |
| 5,784,528 A | 7/1998 | Yamane et al. | |
| 5,819,003 A | 10/1998 | Hirayama et al. | |
| 5,835,493 A | 11/1998 | Magee et al. | |
| 5,854,873 A | 12/1998 | Mori et al. | |
| 5,870,523 A | 2/1999 | Kikuchi et al. | |
| 5,877,817 A | 3/1999 | Moon | |
| 5,884,004 A | 3/1999 | Sato et al. | |
| 5,909,257 A | 6/1999 | Ohishi et al. | |
| 5,913,010 A | 6/1999 | Kaneshige et al. | |
| 5,940,255 A | 8/1999 | Uwabo et al. | |
| 5,949,792 A | 9/1999 | Yasuda et al. | |
| 5,953,187 A | 9/1999 | Uwabo et al. | |
| 5,966,352 A | 10/1999 | Sawabe et al. | |
| 5,987,126 A | 11/1999 | Okuyama et al. | |
| 5,999,698 A | 12/1999 | Nakai et al. | |
| 6,031,962 A | 2/2000 | Sawabe et al. | |
| 6,035,095 A | 3/2000 | Kaneshige et al. | |
| 6,064,796 A | 5/2000 | Nakamura et al. | |
| 6,067,400 A | 5/2000 | Saeki et al. | |
| 6,167,189 A | 12/2000 | Taira et al. | |
| 6,181,870 B1 | 1/2001 | Okada et al. | |
| 6,181,872 B1 * | 1/2001 | Yamane et al. | 386/112 |
| 6,185,365 B1 * | 2/2001 | Murase et al. | 386/95 |
| 6,195,726 B1 | 2/2001 | Hogan | |
| 6,219,488 B1 | 4/2001 | Mori et al. | |
| 6,222,805 B1 | 4/2001 | Mori et al. | |
| 6,285,825 B1 | 9/2001 | Miwa et al. | |
| 6,321,027 B2 | 11/2001 | Honjo | |
| 6,336,002 B1 | 1/2002 | Yamauchi et al. | |
| 6,343,062 B1 | 1/2002 | Furukawa et al. | |
| 6,351,442 B1 | 2/2002 | Tagawa et al. | |
| 6,353,613 B1 | 3/2002 | Kubota et al. | |
| 6,360,055 B1 | 3/2002 | Kaneshige et al. | |
| 6,377,747 B1 | 4/2002 | Murase et al. | |
| 6,385,388 B1 | 5/2002 | Lewis et al. | |
| 6,385,389 B1 | 5/2002 | Maruyama et al. | |
| 6,385,394 B1 | 5/2002 | Okada et al. | |
| 6,385,398 B1 | 5/2002 | Matsumoto | |
| 6,393,574 B1 | 5/2002 | Kashiwagi et al. | |
| 6,415,101 B1 | 7/2002 | DeCarmo et al. | |
| 6,424,797 B1 | 7/2002 | Murase et al. | |
| 6,445,872 B1 | 9/2002 | Sano et al. | |
| 6,470,140 B1 | 10/2002 | Sugimoto et al. | |
| 6,470,460 B1 | 10/2002 | Kashiwagi et al. | |
| 6,504,996 B1 | 1/2003 | Na et al. | |
| 6,515,101 B1 | 2/2003 | Sheares | |
| 6,546,195 B2 | 4/2003 | Kashiwagi et al. | |
| 6,556,774 B2 | 4/2003 | Tsumagari et al. | |
| 6,564,006 B1 | 5/2003 | Mori et al. | |
| 6,567,608 B2 | 5/2003 | Mori et al. | |
| 6,573,819 B1 | 6/2003 | Oshima et al. | |
| 6,584,277 B2 | 6/2003 | Tsumagari et al. | |
| 6,603,517 B1 | 8/2003 | Shen et al. | |
| 6,618,396 B1 | 9/2003 | Kondo et al. | |
| 6,654,543 B2 | 11/2003 | Ando et al. | |
| 6,788,883 B1 * | 9/2004 | Park et al. | 386/125 |
| 6,801,713 B1 | 10/2004 | Yagawa et al. | |
| 6,901,078 B2 | 5/2005 | Morris | |
| 6,904,227 B1 | 6/2005 | Yamamoto et al. | |
| 7,024,102 B1 | 4/2006 | Inoshita et al. | |
| 7,072,573 B2 * | 7/2006 | Okada et al. | 386/95 |
| 7,106,946 B1 | 9/2006 | Kato | |
| 7,124,303 B2 | 10/2006 | Candelore et al. | |
| 7,236,687 B2 | 6/2007 | Kato et al. | |
| 7,245,825 B2 * | 7/2007 | Kikuchi et al. | 386/95 |
| 2001/0033517 A1 | 10/2001 | Ando et al. | |
| 2001/0038745 A1 * | 11/2001 | Sugimoto et al. | 386/95 |
| 2001/0043790 A1 * | 11/2001 | Saeki et al. | 386/65 |
| 2001/0053280 A1 | 12/2001 | Yamauchi et al. | |
| 2002/0015383 A1 | 2/2002 | Ueno | |
| 2002/0015581 A1 * | 2/2002 | Ando et al. | 386/95 |
| 2002/0021761 A1 | 2/2002 | Zhang et al. | |
| 2002/0031336 A1 | 3/2002 | Okada et al. | |
| 2002/0046328 A1 * | 4/2002 | Okada | 711/151 |
| 2002/0076201 A1 | 6/2002 | Tsumagari et al. | |
| 2002/0097981 A1 | 7/2002 | Seo et al. | |
| 2002/0097984 A1 | 7/2002 | Abecassis | |
| 2002/0106196 A1 | 8/2002 | Yamauchi et al. | |
| 2002/0127002 A1 | 9/2002 | Mori et al. | |
| 2002/0145702 A1 | 10/2002 | Kato et al. | |
| 2002/0159368 A1 | 10/2002 | Noda et al. | |
| 2002/0180803 A1 | 12/2002 | Kaplan et al. | |
| 2002/0196365 A1 | 12/2002 | Cho et al. | |
| 2002/0197059 A1 | 12/2002 | Cho et al. | |
| 2003/0002194 A1 | 1/2003 | Andoh | |
| 2003/0026597 A1 | 2/2003 | Cho et al. | |
| 2003/0118327 A1 | 6/2003 | Um et al. | |
| 2003/0123849 A1 | 7/2003 | Nallur et al. | |
| 2003/0133509 A1 | 7/2003 | Yanagihara et al. | |
| 2003/0161615 A1 | 8/2003 | Tsumagari et al. | |
| 2003/0221055 A1 | 11/2003 | Okada | |
| 2003/0235403 A1 | 12/2003 | Seo et al. | |
| 2003/0235404 A1 | 12/2003 | Seo et al. | |
| 2004/0086261 A1 | 5/2004 | Hanes | |
| 2004/0156621 A1 | 8/2004 | Seo et al. | |
| 2004/0179819 A1 | 9/2004 | Cho et al. | |
| 2004/0179820 A1 | 9/2004 | Kashiwagi et al. | |
| 2004/0179827 A1 | 9/2004 | Cho et al. | |
| 2004/0247290 A1 | 12/2004 | Seo et al. | |
| 2004/0252975 A1 | 12/2004 | Cho et al. | |
| 2005/0025458 A1 | 2/2005 | Sasamoto et al. | |
| 2005/0025459 A1 | 2/2005 | Kato et al. | |
| 2005/0036763 A1 | 2/2005 | Kato et al. | |
| 2005/0180289 A1 | 8/2005 | Manabu et al. | |
| 2005/0232111 A1 * | 10/2005 | Sawabe et al. | 369/59.25 |
| 2006/0062547 A1 | 3/2006 | Hamada | |
| 2006/0222340 A1 * | 10/2006 | Yamauchi et al. | 386/95 |
| 2007/0031122 A1 * | 2/2007 | Yamagata et al. | 386/95 |

FOREIGN PATENT DOCUMENTS

| | | |
|---|---|---|
| CN | 1150293 | 5/1997 |
| CN | 1197573 | 10/1998 |
| CN | 1220458 | 6/1999 |
| CN | 1237852 | 12/1999 |
| CN | 1251461 | 4/2000 |
| CN | 1146902 | 4/2004 |
| CN | 1150757 | 5/2004 |
| EP | 0723216 | 7/1996 |
| EP | 0737980 | 10/1996 |
| EP | 0836183 | 4/1998 |
| EP | 0836189 | 4/1998 |
| EP | 0847198 | 6/1998 |
| EP | 0873022 | 10/1998 |
| EP | 0896337 | 2/1999 |
| EP | 0917355 | 5/1999 |
| EP | 0918438 | 5/1999 |
| EP | 0920203 | 6/1999 |
| EP | 0940983 | 9/1999 |
| EP | 1 003 338 | 5/2000 |
| EP | 1 043 724 | 10/2000 |
| EP | 1081885 | 3/2001 |
| EP | 1126454 | 8/2001 |
| EP | 1198132 | 4/2002 |
| EP | 1198133 | 4/2002 |
| EP | 1202568 | 5/2002 |
| JP | 64-003781 | 1/1989 |
| JP | 01-116819 | 5/1989 |
| JP | 08-088832 | 4/1996 |
| JP | 08-235833 | 9/1996 |
| JP | 09-023403 | 1/1997 |
| JP | 09-251759 | 9/1997 |

| | | |
|---|---|---|
| JP | 10-032780 | 2/1998 |
| JP | 10-040667 | 2/1998 |
| JP | 10-51737 | 2/1998 |
| JP | 10-269698 | 10/1998 |
| JP | 10-271449 | 10/1998 |
| JP | 10-299698 | 11/1998 |
| JP | 11-041563 | 2/1999 |
| JP | 11-066813 | 3/1999 |
| JP | 11-103444 | 4/1999 |
| JP | 11-134812 | 5/1999 |
| JP | 11-185463 | 7/1999 |
| JP | 11-259976 | 9/1999 |
| JP | 11-346341 | 12/1999 |
| JP | 2000-030414 | 1/2000 |
| JP | 2000-041066 | 2/2000 |
| JP | 2000-069437 | 3/2000 |
| JP | 2000-113602 | 4/2000 |
| JP | 2000-149514 | 5/2000 |
| JP | 2000-235779 | 8/2000 |
| JP | 2000-293938 | 10/2000 |
| JP | 2000-299836 | 10/2000 |
| JP | 2000-348442 | 12/2000 |
| JP | 2001-024973 | 1/2001 |
| JP | 2001-024985 | 1/2001 |
| JP | 2001-111944 | 1/2001 |
| JP | 2001-67802 | 3/2001 |
| JP | 2001-111929 | 4/2001 |
| JP | 2001-111960 | 4/2001 |
| JP | 2001-169246 | 6/2001 |
| JP | 2001-297535 | 10/2001 |
| JP | 2002-083486 | 3/2002 |
| JP | 2002-112179 | 4/2002 |
| JP | 2002-150685 | 5/2002 |
| JP | 2002-158972 | 5/2002 |
| JP | 2002-158974 | 5/2002 |
| JP | 2002-176623 | 6/2002 |
| JP | 2002-216460 | 8/2002 |
| JP | 2002-222581 | 8/2002 |
| JP | 2003-087744 | 3/2003 |
| JP | 2003-116100 | 4/2003 |
| JP | 2006-503400 | 1/2006 |
| KR | 10-1999-0022858 | 10/1997 |
| KR | 10-2000-0031861 | 6/2000 |
| KR | 10-2000-0055028 | 9/2000 |
| KR | 10-2000-0056179 | 9/2000 |
| KR | 10-2000-0065876 | 11/2000 |
| KR | 10-2001-0022702 | 3/2001 |
| KR | 10-0294884 | 4/2001 |
| KR | 10-2001-0098007 | 11/2001 |
| KR | 10-2001-0098101 | 11/2001 |
| KR | 10-2001-0107578 | 12/2001 |
| KR | 10-2002-0006674 | 1/2002 |
| KR | 10-2002-0020919 | 3/2002 |
| KR | 10-2002-0097454 | 12/2002 |
| KR | 10-2002-0097455 | 12/2002 |
| KR | 10-2004-0000290 | 1/2004 |
| KR | 10-2004-0030992 | 4/2004 |
| KR | 10-2004-0030994 | 4/2004 |
| KR | 10-2004-0030995 | 4/2004 |
| KR | 10-2004-0041581 | 5/2004 |
| TW | 391548 | 5/2000 |
| WO | WO 97/06531 | 2/1997 |
| WO | WO 97/13364 | 4/1997 |
| WO | WO 97/13365 | 4/1997 |
| WO | WO 97/13366 | 4/1997 |
| WO | WO 98/00952 | 1/1998 |
| WO | WO 99/08281 | 2/1999 |
| WO | WO 99/34601 | 7/1999 |
| WO | WO 00/02195 | 1/2000 |
| WO | WO 00/05883 | 2/2000 |
| WO | WO 00/42515 | 7/2000 |
| WO | WO 00/62295 | 10/2000 |
| WO | WO 01/80239 | 10/2001 |
| WO | WO 01/82604 | 11/2001 |
| WO | WO 01/82606 | 11/2001 |
| WO | WO 01/82609 | 11/2001 |
| WO | WO 01/82610 | 11/2001 |
| WO | WO 2004/001750 | 12/2003 |
| WO | WO 2004/001753 | 12/2003 |
| WO | WO 2004/45206 | 5/2004 |
| WO | WO2004/0075181 | 9/2004 |
| WO | WO 2004-075183 | 9/2004 |
| WO | WO 2004/077417 | 9/2004 |
| WO | WO 2004/079736 | 9/2004 |
| WO | WO 2004/081939 | 9/2004 |
| WO | WO 2004/086371 | 10/2004 |

OTHER PUBLICATIONS

Japanese Office Action dated Jan. 22, 2008.
European Search Report dated Dec. 28, 2007.
European Search Report dated Jan. 2, 2008.
United States Office Action dated Jan. 2, 2008.
United States Office Action dated Jan. 28, 2008.
Japanese Office Action dated May 20, 2008.
European Search Report dated Aug. 13, 2008.
Search Report for corresponding European Application No. 03761863.4 dated Mar. 31, 2008.
Office Action for corresponding Japanese Application No. 2004-517368 dated May 7, 2008.
Office Action for corresponding Japanese Application No. 2004-517390 dated May 7, 2008.
Office Action for corresponding Japanese Application No. 2006-196199 dated Apr. 22, 2008.

\* cited by examiner

*PGC Information # i ( PGCI # i)*

| PGC General Information (PGC_GI) |
|---|
| Program Information # 1 (PGI #1) |
| ⋮ |
| Program Information # k (PGI #k) |
| ⋮ |
| Program Information # n (PGI #n) |
| Cell Information Search Pointer #1 (CI_SRP #1) |
| ⋮ |
| Cell Information Search Pointer #n (CI_SRP #m) |
| Cell Information #1 (CI #1) |
| ⋮ |
| Cell Information #k (CI #k) |
| ⋮ |
| Cell Information #m (CI #m) |

| Reserved |
|---|
| PG_TY ( Program Type ) |
| C_Ns ( Number of Cells in this PG ) |
| PRM_TXTI ( Primary Text Information ) |
| REP_PI ( Representative Picture Information ) |
| THM_SRPN ( Thumbnail Search Pointer Number ) |
| IT_TXT_SRPN ( IT_TXT Search Pointer Number for this Play List ) |

| C_TY ( Cell Type ) |
|---|
| HOBI_SRPN ( HOBI Search Pointer Number ) |
| CHI (Channel Information) |
| PTMAPN ( PTMAP Number ) |
| C_V_S_PTM ( start PTM of this Cell ) |
| C_V_E_PTM ( End PTM of this Cell ) |

RECORDING MEDIUM HAVING DATA STRUCTURE FOR MANAGING REPRODUCTION OF AT LEAST VIDEO DATA REPRESENTING MULTIPLE REPRODUCTION PATHS AND RECORDING AND REPRODUCING METHODS AND APPARATUSES

RELATED APPLICATION DATA

This is a continuation of application Ser. No. 10/201,454 filed Jul. 23, 2002; the contents of which is hereby incorporated by reference in its entirety.

BACKGROUND OF THE INVENTION

1. Field of the Invention

The present invention relates to a recording medium having a data structure for managing reproduction of at least video data representing multiple reproduction paths as well as methods and apparatuses for reproduction and recording.

2. Description of the Related Art

Owing to technical improvement in the fields of video/audio data compression, digital modulation/demodulation, and so on, a digital television broadcast system broadcasting TV signals in the form of digital data stream is being standardized rapidly.

In the digital television broadcast system, audio/video (A/V) signals to be broadcasted are compressed according to the data compressing rule specified by MPEG 2 (Moving Picture Experts Group) and the compressed A/V data are broadcasted in the form of transport stream (TS), which is also defined in MPEG 2 standard, composed of successive 188-byte-long transport packets (TPs).

The digital TV broadcast system, which will be commercialized soon owing to technical improvement of A/V data compression and transmission, is able to support much higher-quality of video and audio than an analog TV system. Furthermore, it ensures data compatibility with a digital communication device, a digital storage device, etc.

In the meantime, a new device is being developed to prepare for commercialization of digital TV broadcast system. That is a digital recorder being able to receive TS of digital broadcast programs and to record it on a writable HD-DVD. Such a digital recorder will be widely used as the digital TV broadcast system is commercialized in earnest.

A single physical broadcast channel (called 'RF channel' in general) has about 6 MHz bandwidth which ensures 19.4 Mbps data rate. This data rate can carry a single HD-TV broadcast signal or about four SD-TV signals. Such a logical or virtual channel carrying one SD-TV signal in an RF channel is called 'digital channel'.

In other words, a single RF channel sometimes includes several digital channels, namely, sub-channels which carry mutually-different broadcast programs.

Therefore, a DVD recorder being developed may have to record two or more digital channels simultaneously at a user's request. However, if a DVD recorder records a plurality of digital channels and creates management information through the same manner as it does for a single digital channel, a DVD could not tell digital channels apart among a recorded stream of digital channels. Namely, a user could not select only one program, i.e., one digital channel to be reproduced among the recorded plurality of digital channels.

SUMMARY OF THE INVENTION

The recording medium according to the present invention includes a data structure for managing the reproduction of at least video data representing multiple reproduction paths.

In one exemplary embodiment, a data area of the recording medium stores at least video data as a transport stream in more than one file. Each file is associated with a different one of the multiple reproduction paths, and the files are interleaved with one another.

In one embodiment, each file is divided into data blocks, and the files are interleaved with one another on a data block by data block basis. For example, each data block may represent at least an intra-coded picture of video data. As another example, each data block represents at least one group of pictures (GOP).

In another embodiment, the recording medium also includes a navigation area storing navigation information. The navigation information includes a map associated with each file, and each map provides position data for the video data of the associated file.

The navigation area may also include a navigation data item. The navigation data item provides navigation information for reproducing each of the files. The navigation data item may also include a multiple reproduction path indicator indicating that the navigation data item provides navigation information for multiple reproduction paths.

The present invention further provides apparatuses and methods for recording and reproducing the data structure according to the present invention.

BRIEF DESCRIPTION OF THE DRAWINGS

The accompanying drawings, which are included to provide a further understanding of the present invention, illustrate the example embodiments of the invention, and together with the description, serve to explain the principles of the present invention, and wherein.

DETAILED DESCRIPTION OF THE EXEMPLARY EMBODIMENTS

In order that the invention may be fully understood, a example embodiment thereof will now be described with reference to the accompanying drawings.

Figure 1:
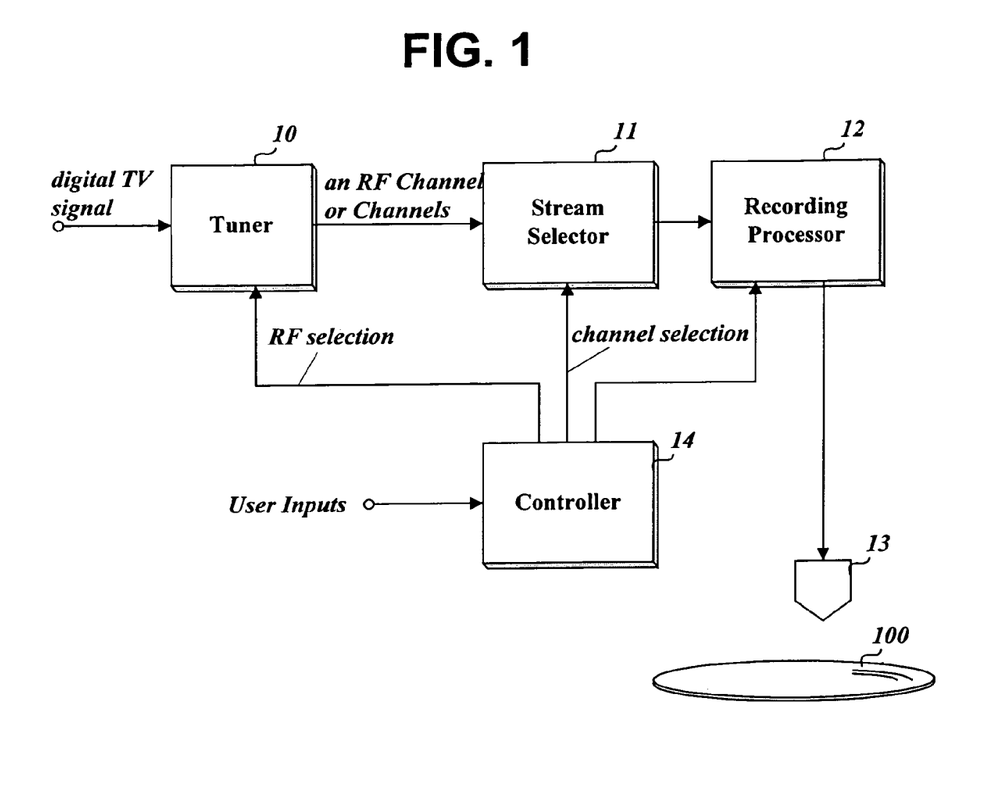
FIG. 1 is a block diagram of an apparatus recording a multi-channel stream in accordance with the present invention.

FIG. 1 is a block diagram of an apparatus recording a multi-channel stream in accordance with the present invention.

The apparatus of FIG. 1 may be a digital video recorder (DVR) being able to record a digital broadcast signal on a recording medium, e.g., a writable HD-DVD. The apparatus comprises a tuner 10 tuning its passband to at least one RF band of digital broadcast TV signal; a stream selector 11 selecting a plurality of substreams belonging to chosen digital channels (or sub-channels) from a data stream of an RF channel or channels passed by the tuner 10; a recording processor 12 recording the selected substreams in a single HOB (High-Density Stream Object) or HOBs according to a preset recording mode, creating and writing navigation data every a recorded substream; an optical pickup 13 forming mark/space patterns on a HD-DVD 100 in accordance with bit patterns of stream and navigation data outputted from the recording processor 12; and a controller 14 conducting overall control operations of all elements for multi-stream record.

Figure 2:
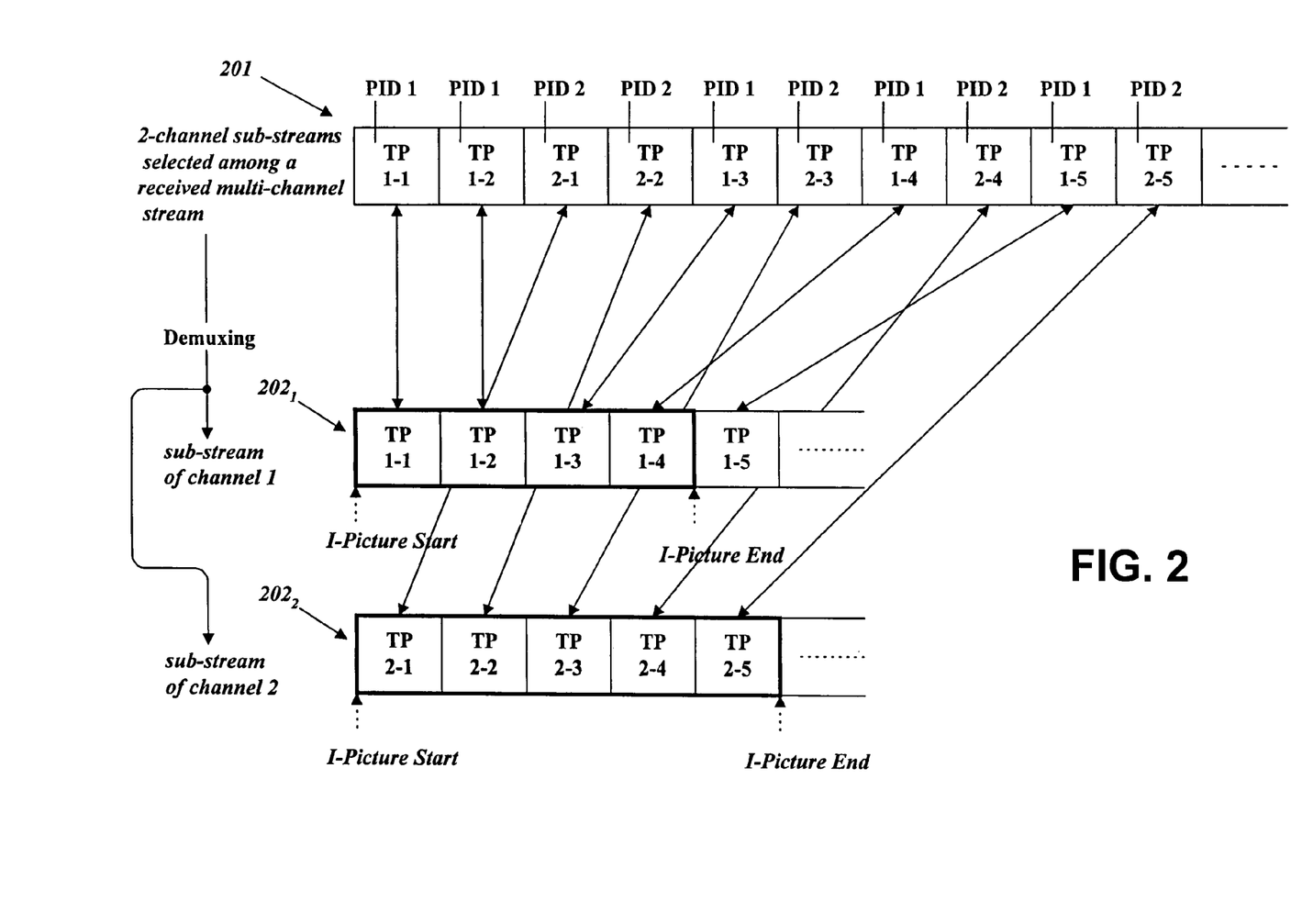
FIG. 2 illustrates a series of transport packets belonging to two sub-channels outputted in the form of single stream or mutually-separated streams.

The tuner 10 passes one digital broadcast TV channel, namely, an RF channel selected by the controller 14. The stream selector 11 extracts transport packets (TPs) belonging to several, e.g., 2 digital channels selected through the controller 14 from a multi-channel stream of the RF channel passed by the tuner 10. The extracted series of TPs by the stream selector 11 is outputted in the form of single stream 201 or mutually-separated streams $202_1$ and $202_2$, as illustrated in FIG. 2.

The tuner 10 can also pass multiple RF channels. In multiple passing mode, the stream selector 11 is also able to extract more than one substream from each RF channel to output a series of TPs belonging to digital channels chosen from available channels offered by respective RF channels.

For the convenience of explanation, it is supposed in all embodiments described in below that the stream selector 11 selects two substreams, namely, two digital channels from a received multi-channel stream.

The recording processor 12 can distinguish two digital-channel substreams, namely, the first and the second substream each other based on packet ID (PID) written in every TP outputted from the stream selector 11.

The first and the second digital-channel substream are recorded according to a preset recording mode. If the preset recording mode is 'separate', the recording processor 12 records two multiplexed substreams separately in two allocated HOBs 301 and 302 in the order as they are received for each digital channel from the stream selector 12 as shown in FIG. 3.

To separately record a plurality of substreams in plural HOBs, the recording processor 12 has enough buffering capacity. And, the optical pickup 13 moves between allocated plural HOBs during data buffering of the recording processor 12 and it records the buffered data in a target HOB all at once.

Furthermore, the recording processor 12 creates navigation data for each digital-channel substream, namely, for each HOB based on the distinguished digital-channel information and each substream recording information. The way how navigation data is created is described below in detail.

Figure 3:
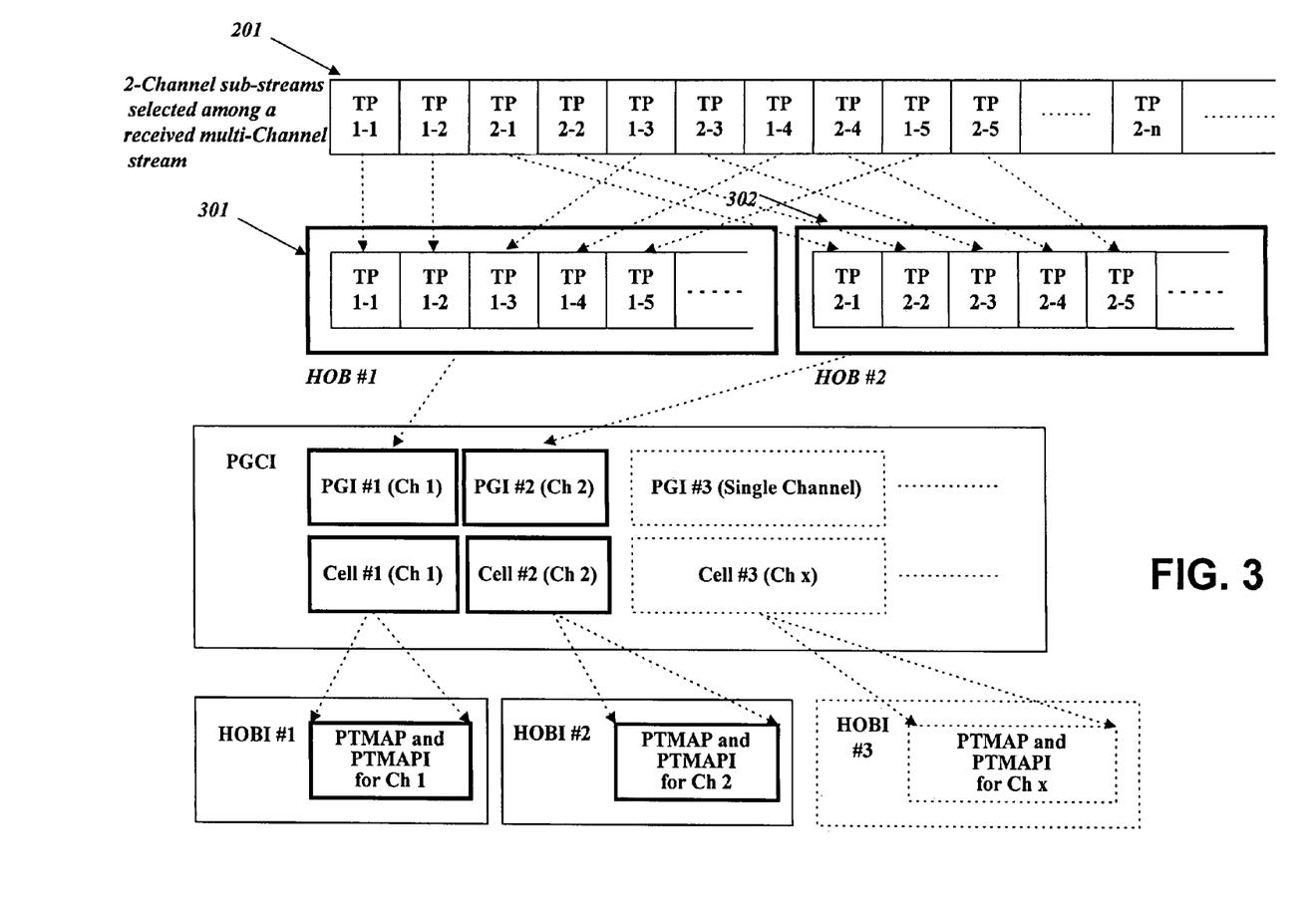
FIG. 3 illustrates the first embodiment of creating navigation data for substreams of a plurality of digital channels recorded in plural high-density stream objects in accordance with the present invention.

FIG. 3 illustrates the first embodiment of creating navigation data for substreams of a plurality of digital channels recorded in plural HOBs in accordance with the present invention.

A recording medium for recording a digital broadcast signal has a provisional recording standard. According to the provisional recording standard, a recording medium shall have Program Chain Information (PGCI) prepared for index of every recorded program and for reproduction order among them. The PGCI includes Program Information (PGI) and Cell Information (CI) which are respectively created every a data stream continuously recorded from recording start to stop. Furthermore, a single Presentation Time Map (PTMAP) shall be also created every a recorded data stream according to the provisional recording standard. The PTMAP, used for stream search, has collection of position data or position-related time length data for every data unit constituting a recorded data stream. Search pointer and information of each P are included in HOB information (HOBI).

However, in the present recording method, not a single but plural HOBs are formed through one-time recording of a multi-channel stream. Therefore, for two substreams separated in two HOBs, two pieces of PGI 'PGI #1 and PGI #2' and two pieces of CI 'Cell #1 and Cell #2' are created and two pieces of PTMAPI for two PTMAPs are created too, as shown in FIG. 3.

The PGI and the CI are written in the PGCI while the two pieces of PTMAPI and the two PTMAPs are stored separately in the two pieces of HOBI.

In general, navigation data such as PGCI and HOBI is loaded into a memory (not figured) from the HD-DVD 100 during recording mode, and the pieces of PGI, CI and HOBI created as above are inserted in the navigation data which will be stored in a navigation data area of the HD-DVD 100 after the substreams of plural digital channels are completely recorded.

Figure 4:
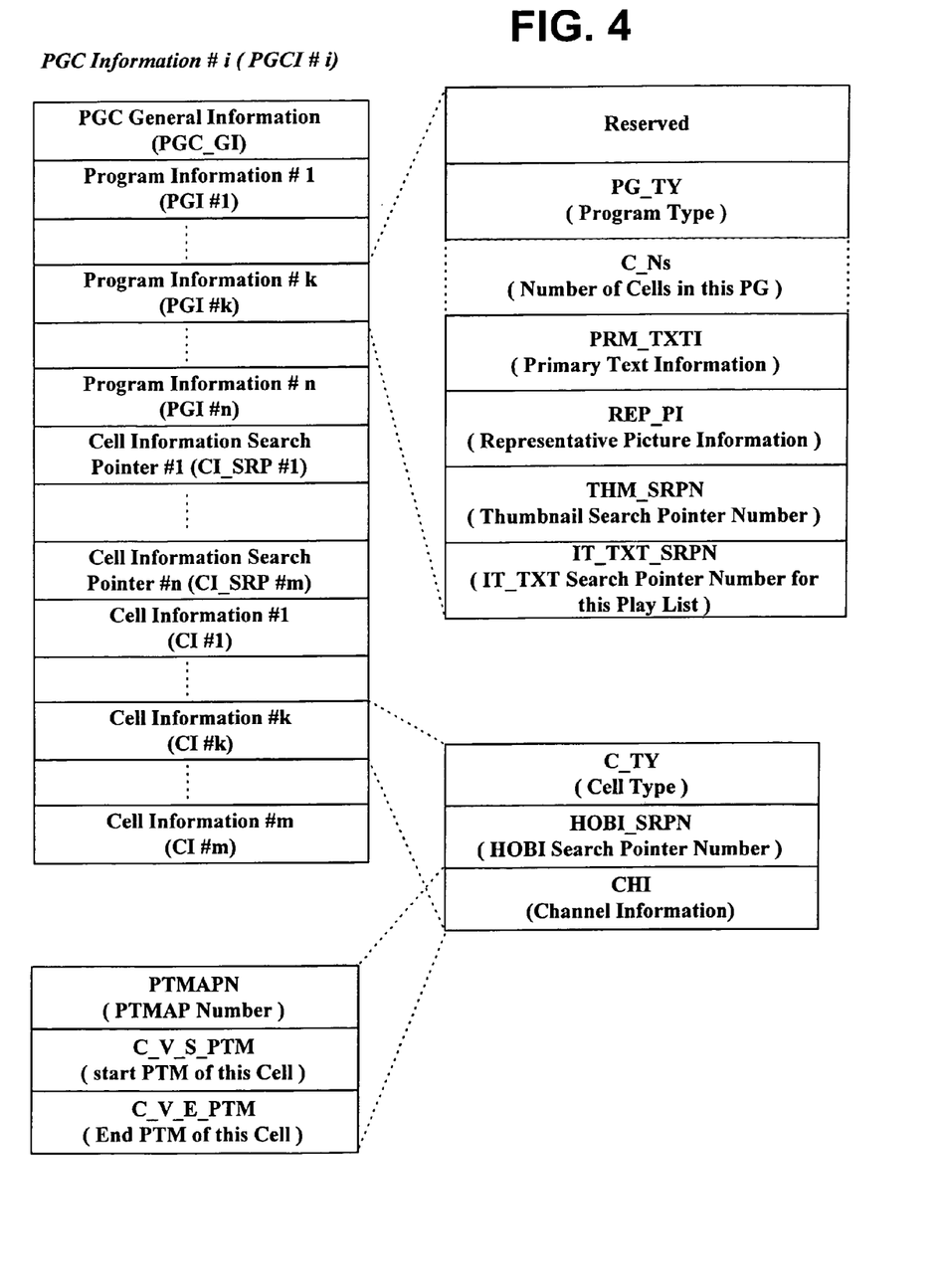
FIGS. 4 and 5 are illustrative structures of navigation data created when a multi-channel stream is recorded as shown in FIG. 3.
Figure 5:
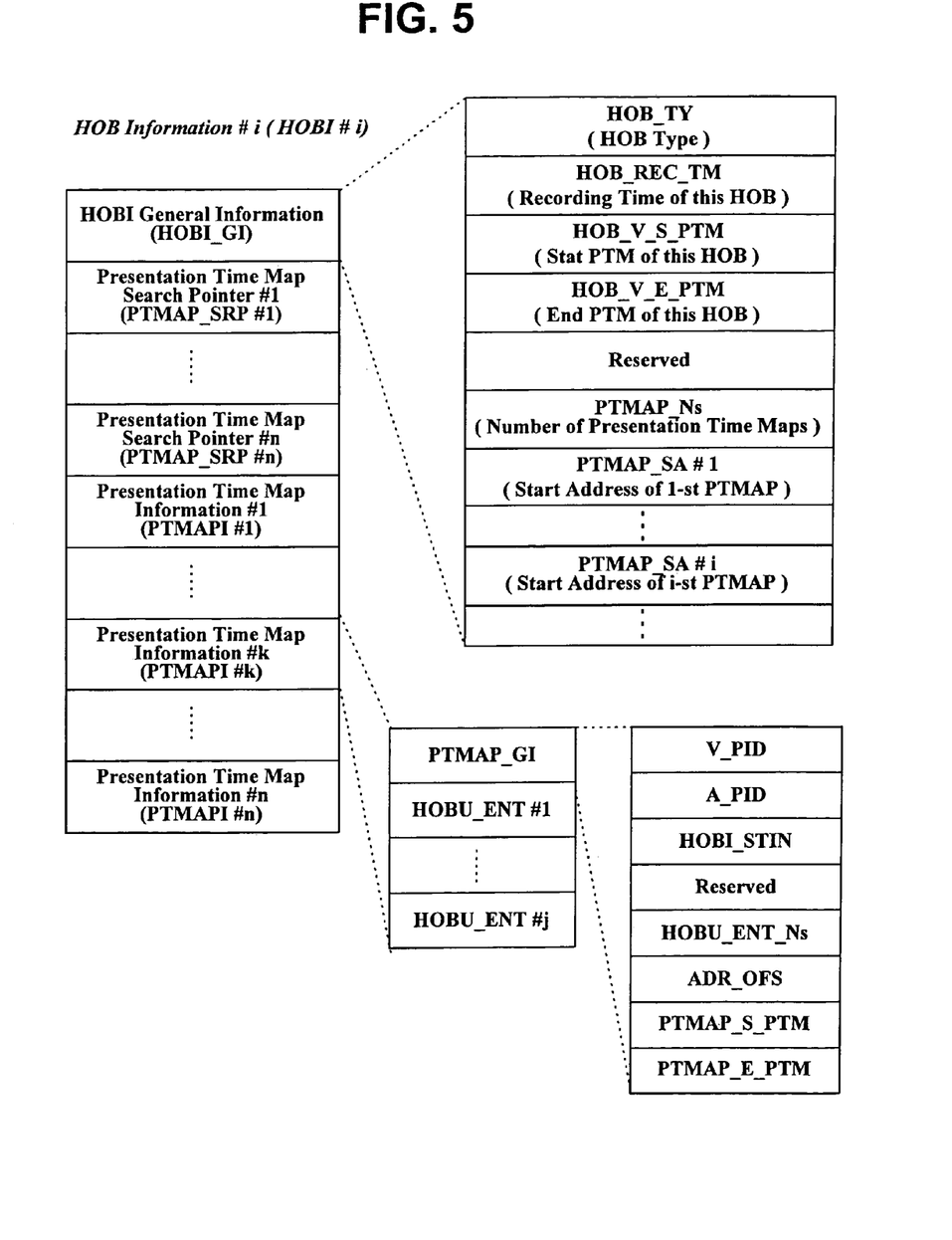

FIGS. 4 and 5 are illustrative structures of navigation data created when a multi-channel stream is recorded as shown in FIG. 3.

The PGCI of FIG. 4 includes program chain general information 'PGC_GI', plural pieces of PGI 'PGI #1 to #n', a plurality of CI search pointers 'CI_SRP #1 to #m', and plural pieces of CI 'CI #1 to #m'. Each piece of PGI includes fields of program type 'PG_TY' and the number of CI 'C_Ns'. However, the number of CI 'C_Ns' may not be allocated since a single piece of PGI is associated with a single piece of CI. If allocated, '1' is always written in that field 'C_Ns'.

The program type 'PG_TY', 8-bit long, includes 'Protect' flag to indicate whether an associated program (PG), equivalent to a conceptually-unitized stream, is erasable or not.

Each piece of CI is composed of cell type 'C_TY', HOBI search pointer number 'HOBI_SRPN', and channel information 'CHI' consisting of PTMAP number 'PTMAPN', start PTM of a cell 'C_V_S_PTM', and end PTM of a cell 'C_V_E_PTM'.

The field 'C_TY', 8-bit long, is composed of sub-fields of 2-bit cell type 'C_TY1', 3-bit channel number of a cell 'C_CH_N', and reserved. The sub-field 'C_TY1' indicates whether a cell is related with multi-channel or single-channel stream. The sub-field 'C_CH_N' describes digital channel number of a recorded substream in a HOB referred by a cell.

For example, digital channel numbers of the first and the second substream are respectively written in those sub-fields 'C_CH_N' of the two pieces of CI 'CIs #1 and #2' respectively referring to the HOBs 301 and 302 of FIG. 3 in which two substreams of two digital channels are separately included.

The HOBI, linked with the CI through the field 'HOBI_S_RPN' included in each piece of CI, comprises HOBI general information 'HOBI_GI', a plurality of PTMAP search pointers 'PTMAP_SRP #1 to #n', and plural pieces of PTMAP information 'PTMAPI #1 to #n', as shown in FIG. 5.

The HOBI general information 'HOBI_GI' consists of many fields of HOB type 'HOB_TY', HOB recording time 'HOB_REC_TM', start PTM of a HOB, end PTM of a HOB, the number of PTMAPs 'PTMAP_Ns', and start addresses of all PTMAPs 'PTMAP_SA #i'.

The PTMAPI includes PTMAP general information 'PTMAP_GI' and entries of random accessible HOB units (HOBUs) 'HOBU_ENT #1 to #j'. The PTMAP general information 'PTMAP_GI' is composed of fields of video 'V_PID' and audio packet ID 'A_PID', indicative of respective PIDs of audio and video TPs constituting a recorded stream associated with a PTMAP, HOBI index number 'HOBI_STIN', the number of random accessible HOBUs 'HOBU_ENT_Ns', start PTM of a PTMAP 'PTMAP_S_PTM', and end PTM of a PTMAP 'PTMAP_E_PTM'.

Since all substreams constituting a multi-channel stream are separately recorded in plural HOBs and the navigation data structured as shown in FIGS. 4 and 5 is created and recorded for a recorded multi-channel stream, a HOB containing a single substream of a digital channel to be reproduced can be determined based on information written in each piece of PGI and CI included in the PGCI, especially the channel number sub-field 'C_CH_N' allocated in the cell type 'C_TY'.

When searching a substream of a chosen digital channel unitized to a single HOB, a PTMAP associated with a substream of the chosen digital channel is determined first based on the information written in the number of PTMAPs 'PTMAP_Ns', each PTMAP start address 'PTMAP_SA #i', and start and end PTM of a PTMAP 'PTMAP_S_PTM' and 'PTMAP_E_PTM' of the PTMAP general information 'PTMAP_GI' of each piece of PTMAP information 'PTMAPI #i'. Next, a substream in the determined HOB is searched and then reproduced using PTM incremental time and size of each data unit written in the determined PTMAP.

Figure 6:
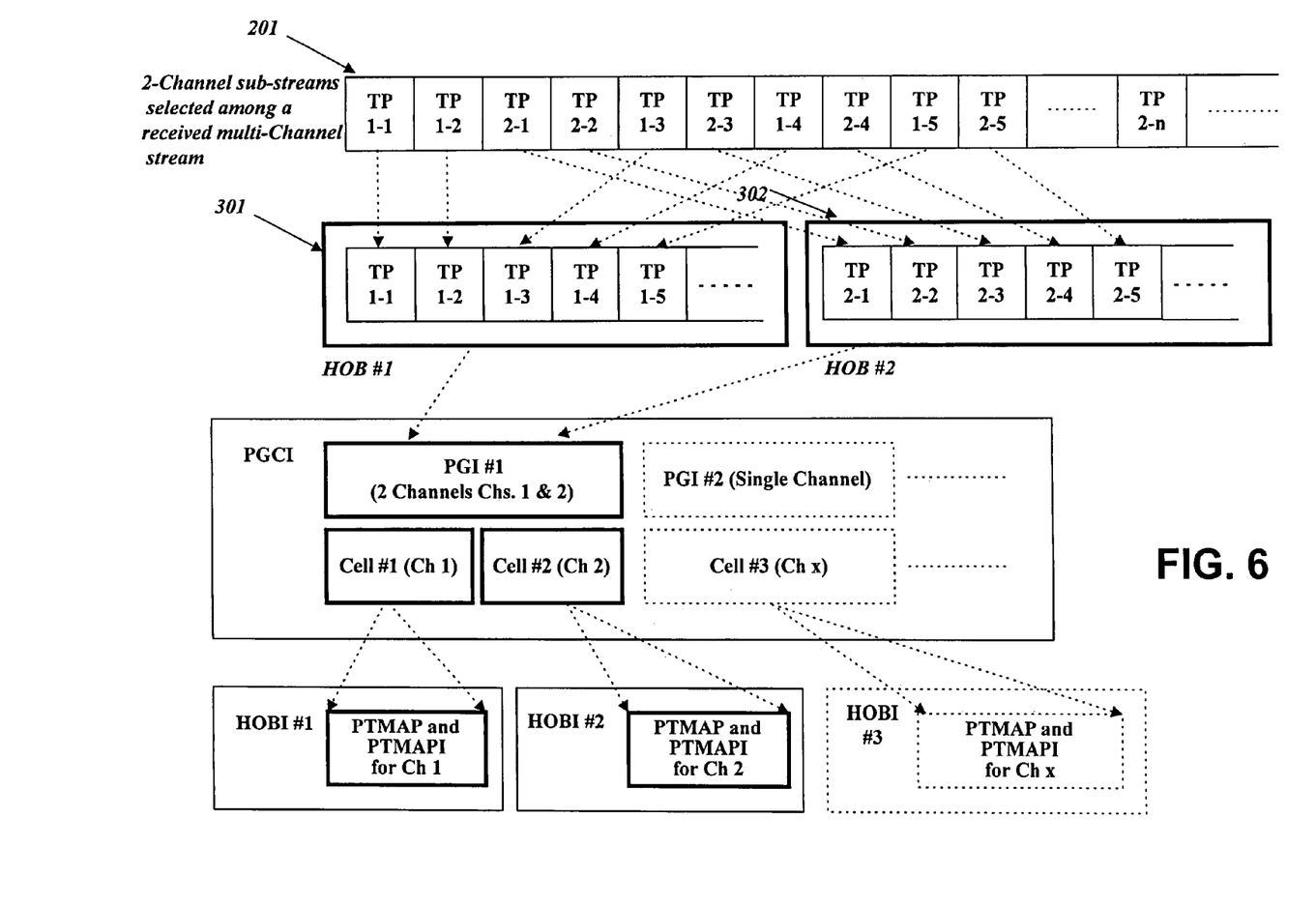
FIG. 6 illustrates the second embodiment of creating navigation data for substreams of a plurality of digital channels recorded in plural high-density stream objects in accordance with the present invention.

FIG. 6 illustrates the second embodiment of creating navigation data for substreams of a plurality of digital channels recorded in plural HOBs in accordance with the present invention.

This second embodiment of FIG. 6 is different from the first of FIG. 3 in that a single piece of PGI is created for plural HOBs. However, a couple of PTMAP and PTMAPI used for searching substream is created every a HOB the same as the first embodiment, namely, as many pieces of PTMAP and PTMAPI as the number of digital channels are created.

Since this second embodiment is different from the first in the number of pieces of PGI created after recording substreams of a plurality of digital channels, the structure of the PGI is changed from FIG. 4.

In this second embodiment, a piece of PGI covers a plurality of substreams, which means that it is associated with plural pieces of CI each of which covers a single substream. Therefore, the PGI shall accompany the field 'C_Ns' to describe the number of pieces of CI associated with it.

The program type 'PG_TY', besides 'Protect' flag, includes 'S/M' flag and 3-bit number of channels 'Channel_Ns' where the 'S/M' indicates whether an associated PG includes a single-channel or a multi-channel stream, and the number of channels 'Channel_Ns' describes the number of digital channels included in an associated PG.

Even in this second embodiment, all information on every recorded substream of every digital channel is included in navigation data the same as in the first embodiment. Therefore, a substream of a selected digital channel only, which is unitized to a single HOB, can be searched and reproduced among multiple substreams recorded simultaneously.

Figure 7:
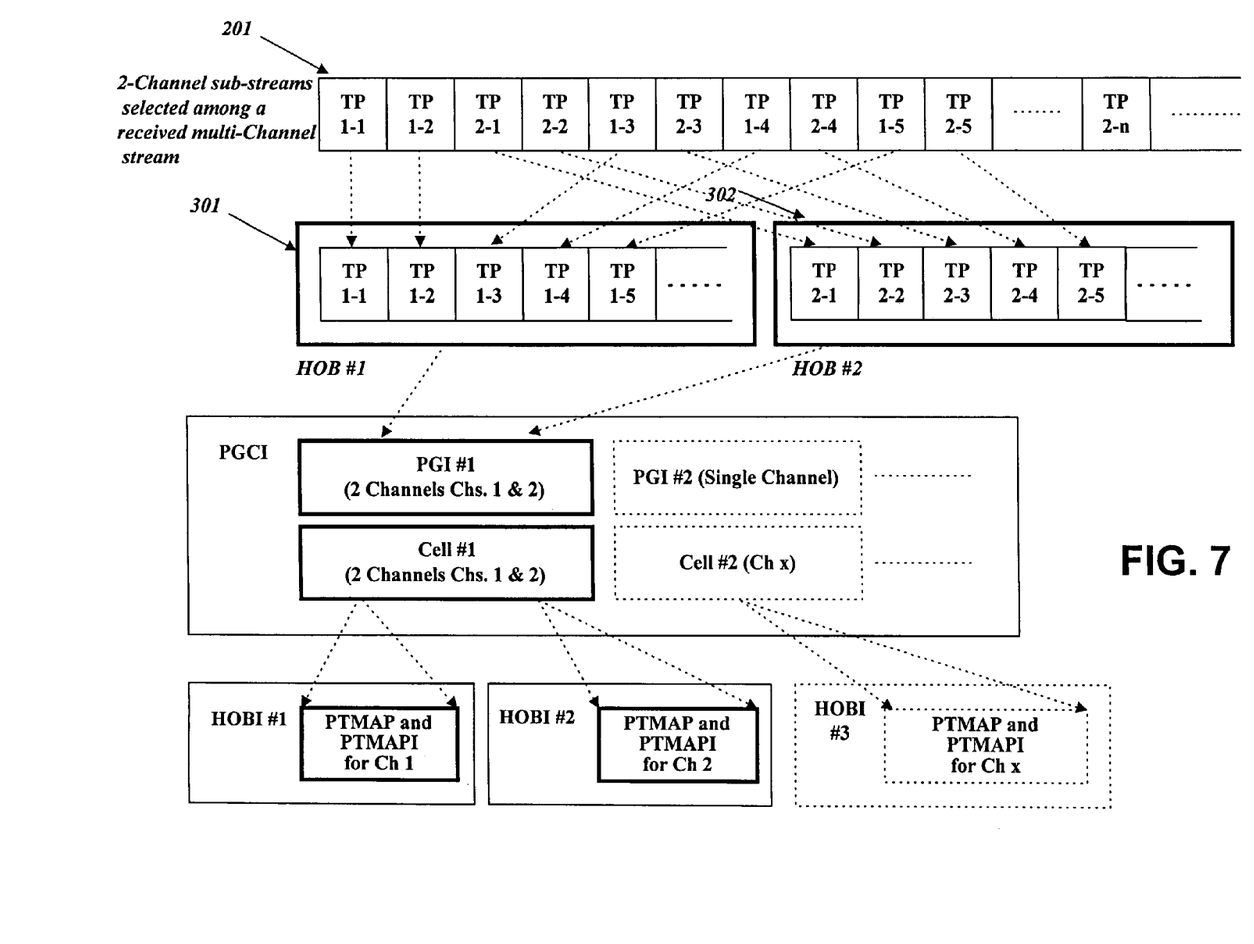
FIG. 7 illustrates the third embodiment of creating navigation data for substreams of a plurality of digital channels recorded in plural high-density stream objects in accordance with the present invention.

FIG. 7 illustrates the third embodiment of creating navigation data for substreams of a plurality of digital channels recorded in plural HOBs in accordance with the present invention.

This third embodiment of FIG. 7 is different from the first of FIG. 3 in that a single piece of PGI and CI is created respectively. However, the PTMAPI used for searching substream is created the same as the first embodiment, namely, as many pieces of PTMAPI as the number of digital channels, equivalent to the number of created HOBs, contained in a multi-channel stream are created.

Since this third embodiment is different from the first in the number of pieces of PGI and CI created after recording substreams of a plurality of digital channels, minor modification is required in the structure of navigation data of FIG. 4.

In this third embodiment, a piece of PGI covers a plurality of substreams, therefore, the program type 'PG_TY', besides 'Protect' flag, includes the 'S/M' flag and the 3-bit number of channels 'Channel_Ns'. Both sub-fields have been described in the second embodiment.

In this third embodiment, a piece of CI also covers a plurality of substreams, therefore a piece of CI includes a 'field of the number of channels' besides the fields of FIG. 4, and the channel information 'CHI' composed of the PTMAP number 'PTMAPN', start PTM of a cell 'C_V_S_PTM', and end PTM of a cell 'C_V_E_PTM' is created as many as the number of digital channels of a recorded multi-channel stream distributed separately by channel in plural HOBs referred by the single piece of CI. In addition, an additional field for writing digital channel numbers is reserved in the CI since a single piece of CI covers all of digital channels contained in a recorded multi-channel stream.

Since the CI also has information on the number of channels of a recorded stream, the sub-field 'Channel_Ns' for the number of channels need not be allocated in the PGI. In addition, because a single piece of CI is created even though a stream of a plurality of digital channels is recorded, the field 'C_Ns' indicative of the number of pieces of CI can be removed from the PGI of FIG. 4.

Even in this third embodiment, all information on every substream of every digital channel is stored in navigation data the same as in the first embodiment. Therefore, a substream of a selected digital channel only, which is unitized to a single HOB, can be searched and reproduced among multiple substreams recorded simultaneously.

In the meantime, a file is created for each digital channel stream. Namely, for the two substreams 301 and 302 unitized to the first #1 and the second HOB #2, respectively, two files, e.g., 'H0001.mts' and 'H0002.mts' are created. Each file has start address of data allocation unit (AU) among AU addresses, which are chained each other in FAT (File Allocation Table), at which corresponding substream has been recorded.

Figure 8:
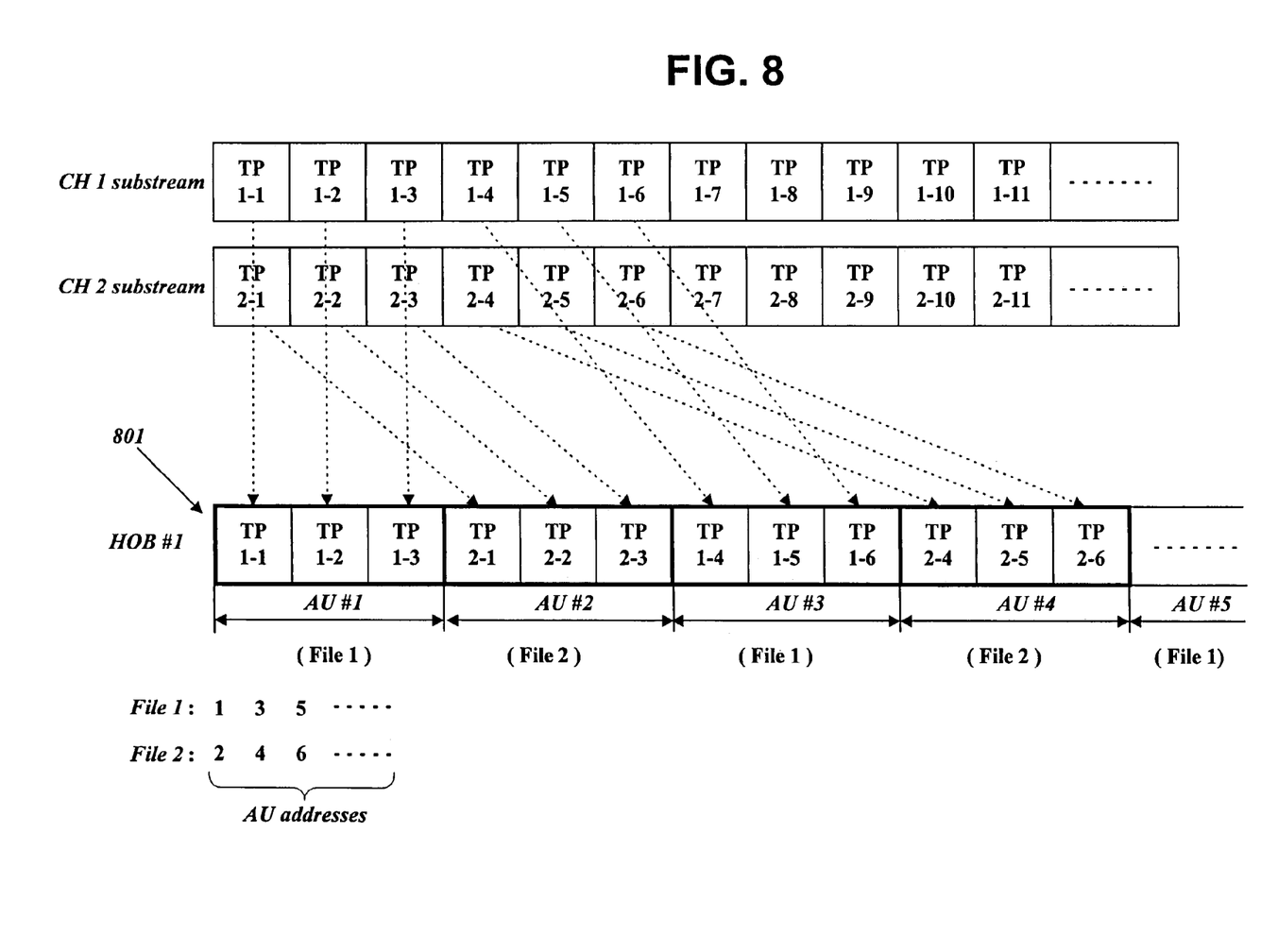
FIG. 8 illustrates plural files created for substreams of a plurality of digital channels recorded in a single high-density stream object in accordance with the present invention.

Unlike the above-explained embodiments, entire multi-channel stream can be unitized to a single HOB. As shown in FIG. 8, the recording processor 12 records two multiplexed substreams from the stream selector 11 in a single HOB 801 while grouping every some TPs for each substream and interleaving grouped units of different channels sequentially. TPs are grouped until their size can fill at least one AU. For instance, the TP-grouped unit interleaved one after another channel is equivalent to a random accessible GOP (Group of Pictures) unit defined in MPEG standard. Since a GOP consists of full pictures only, pictures are not broken even if data is reproduced from its start point, therefore, every GOP ensures random accessibility.

For the case that entire multi-channel stream is written in a single HOB, a file is created for each substream. In other words, as many files as the number of substreams are created. In this embodiment, AUs 1, 2, 3, 4, 5, . . . used for the single HOB alternately belong to one of two files, as shown in FIG. 8.

In the meantime, the size of the TP-grouped unit interleaved one after another channel may be written in a file descriptor of each of the created plural files.

The above-explained multi-channel stream recording method and apparatus make it possible to selectively search and reproduce each substream among a multi-channel stream recorded on a recording medium through selection of files distinguishing substreams individually, thereby improving use convenience of a recording machine such as a digital video recorder.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A recording medium having a data structure for managing reproduction of at least video data representing multiple reproduction paths, comprising:

a data area storing at least video data as a transport stream in more than one stream file, each stream file associated with a different one of the multiple reproduction paths, and the stream files being interleaved with one another; and a navigation area storing at least one navigation list file, the at least one navigation list file including at least a first navigation data item and a second navigation data item, the first navigation data item referencing more than one map for managing the multiple reproduction paths, a flag being stored in the first navigation data item, the value of the flag indicating that the first navigation data item references more than one map, the first navigation data item including an indicator having a value of the number of reproduction paths associated with the first navigation data item, the second data item referencing a single map for managing a single reproduction path, a flag being stored in the second navigation data item, the value of the flag indicating that the second navigation data item references a single map, each navigation data item including an identifier identifying at least one map file associated with the navigation data item, the map file including at least one map referenced by the navigation data item providing position information for the video data, the navigation list file being separate from the map file and stream files.

2. The recording medium of claim 1, wherein each stream file is divided into data blocks, and the stream files are interleaved with one another on a data block by data block basis.

3. The recording medium of claim 2, wherein each data block represents at least an intra-coded picture of video data.

4. The recording medium of claim 2, wherein each data block represents at least one group of transport packets of at least video data, each transport packet including a packet identifier (PID).

5. The recording medium of claim 1, wherein the first and the second navigation data items provide navigation information for reproducing at least one of the stream files.

6. The recording medium of claim 1, wherein each reproduction path represents one of a digital channel and a sub-channel of an RF channel.

7. The recording medium of claim 1, wherein the indicator of the first navigation data item has a value of the number of maps referenced by the first navigation data item.

8. A method of recording a data structure for managing reproduction of at least video data representing multiple reproduction paths, comprising:

recording at least video data as a transport stream in more than one stream file on the recording medium, each stream file associated with a different one of the multiple reproduction paths, and the files being interleaved with one another; and recording at least one navigation list file, one or more navigation data items and a plurality of map files including maps, the at least one navigation list including at least a first navigation data item and a second navigation data item, the first navigation data item referencing more than one map for managing the multiple reproduction paths, a flag being stored in the first navigation data item, the value of the flag indicating that the first navigation data item references more than one map, the first navigation data item including an indicator having a value of the number of reproduction paths associated with the first navigation data item, the second data item referencing a single map for managing a single reproduction path, a flag being stored in the second navigation data item, the value of the flag indicating that the second navigation data item references a single map, each navigation data item including an identifier identifying at least one map file associated with the navigation data item, the map file including at least one map referenced by the navigation data item providing position information for the video data, the navigation list file being separate from the map file and stream files.

9. The method of claim 8, wherein each stream file is divided into data blocks, and the stream files are interleaved with one another on a data block by data block basis.

10. The method of claim 9, wherein each data block represents a group of transport packets of at least of video data, each transport packet including a packet identifier (PID).

11. The method of claim 8, wherein each reproduction path represents one of a digital channel and a sub-channel of an RF channel.

12. The method of claim 8, wherein the indicator of the first navigation data item has a value of the number of maps referenced by the first navigation data item.

13. A method of reproducing a data structure for managing reproduction of at least video data representing multiple reproduction paths, comprising:

reading at least one navigation list file, one or more navigation data items and a plurality of map files including maps, the at least one navigation list including at least a first navigation data item and a second navigation data item, the first navigation data item referencing more than one map for managing the multiple reproduction paths, a flag being stored in the first navigation data item, the value of the flag indicating that the first navigation data item references more than one map, the first navigation data item including an indicator having a value of the number of reproduction paths associated with the first navigation data item, the second data item referencing a single map for managing a single reproduction path, a flag being stored in the second navigation data item, the value of the flag indicating that the second navigation data item references a single map, each navigation data item including an identifier identifying at least one map file associated with the navigation data item, the map file including at least one map referenced by the navigation data item providing position information for the video data; and reproducing at least the video data as a transport stream in more than one stream file from a recording medium, each stream file associated with a different one of the multiple reproduction paths, and the stream files being interleaved with one another, the navigation list file being separate from the map file and stream files.

14. The method of claim 13, wherein each stream file is divided into data blocks, and the stream files are interleaved with one another on a data block by data block basis.

15. The method of claim 14, wherein each data block represents a group of transport packets of at least of video data, each transport packet including a packet identifier (PID).

16. The method of claim 13, wherein each reproduction path represents one of a digital channel and a sub-channel of an RF channel.

17. The method of claim 13, wherein the indicator of the first navigation data item has a value of the number of maps referenced by the first navigation data item.

18. An apparatus for recording a data structure for managing reproduction at least video data representing multiple reproduction paths, comprising:

a pickup configured to record data on a recording medium; and a controller, operably coupled to the pickup, configured to control recording at least video data as a transport stream in more than one stream file on the recording medium, each stream file associated with a different one of the multiple reproduction paths, and the stream files being interleaved with one another, and the controller further configured to control recording at least one navigation list file, one or more navigation data items and a plurality of map files including maps, the at least one navigation list including at least a first navigation data item and a second navigation data item, the first navigation data item referencing more than one map for managing the multiple reproduction paths, a flag being stored in the first navigation data item, the value of the flag indicating that the first navigation data item references more than one map, the first navigation data item including an indicator having a value of the number of reproduction paths associated with the first navigation data item, the second data item referencing a single map for managing a single reproduction path, a flag being stored in the second navigation data item, the value of the flag indicating that the second navigation data item references a single map, each navigation data item including an identifier identifying at least one map file associated with the navigation data item, the map file including at least one map referenced by the navigation data item providing position information for the video data, the navigation list file being separate from the map file and stream files.

19. The apparatus of claim 18, wherein the controller is configured to control recording each stream file being divided into data blocks, and the stream files are interleaved with one another on a data block by data block basis.

20. The apparatus of claim 19, wherein each data block represents a group of transport packets of at least of video data, each transport packet including a packet identifier (PID).

21. The apparatus of claim 18, wherein the controller is configured to control recording transport packets of each reproduction path representing one of a digital channel and a sub-channel of an RF channel.

22. The apparatus of claim 18, wherein the indicator of the first navigation data item has a value of the number of maps referenced by the first navigation data item.

23. An apparatus for reproducing a data structure for managing reproduction of at least video data representing multiple reproduction paths, comprising:

a pickup configured to reproduce data recorded on a recording medium; and a controller, operably coupled to the pickup, configured to control reproducing at least one navigation list file, one or more navigation data items and a plurality of map files including maps, the at least one navigation list including at least a first navigation data item and a second navigation data item, the first navigation data item referencing more than one map for managing the multiple reproduction paths, a flag being stored in the first navigation data item, the value of the flag indicating that the first navigation data item references more than one map, the first navigation data item including an indicator having a value of the number of reproduction paths associated with the first navigation data item, the second data item referencing a single map for managing a single reproduction path, a flag being stored in the second navigation data item, the value of the flag indicating that the second navigation data item references a single map, each navigation data item including an identifier identifying at least one map file associated with the navigation data item, the map file including at least one map referenced by the navigation data item providing position information for the video data, and the controller further configured to control reproducing at least video data stored as a transport stream in more than one stream file from the recording medium according to the reproduced the at least one navigation list, each stream file associated with a different one of the multiple reproduction paths, and the stream files being interleaved with one another, the navigation list file being separate from the map file and stream files.

24. The apparatus of claim 23, wherein the controller is configured to control reproducing each stream file being divided into data blocks, and the stream files are interleaved with one another on a data block by data block basis.

25. The apparatus of claim 24, wherein each data block represents a group of transport packets of at least of video data, each transport packet including a packet identifier (PID).

26. The apparatus of claim 23, wherein the controller is configured to control reproducing transport packets of each reproduction path representing one of a digital channel and a sub-channel of an RF channel.

27. The apparatus of claim 23, wherein the indicator of the first navigation data item has a value of the number of maps referenced by the first navigation data item.

28. A method for creating a data structure for managing reproduction of at least video data representing multiple reproduction paths, comprising:

generating at least video data as a transport stream in more than one stream file, each stream file associated with a different one of the multiple reproduction paths, and the stream files being interleaved with one another; and at least one navigation list file, the at least one navigation list file including at least a first navigation data item and a second navigation data item, the first navigation data item referencing more than one map for managing the multiple reproduction paths, a flag being stored in the first navigation data item, the value of the flag indicating that the first navigation data item references more than one map, the first navigation data item including an indicator having a value of the number of reproduction paths associated with the first navigation data item, the second data item referencing a single map for managing a single reproduction path, a flag being stored in the second navigation data item, the value of the flag indicating that the second navigation data item references a single map, each navigation data item including an identifier identifying at least one map file associated with the navigation data item, the map file including at least one map referenced by the navigation data item providing position information for the video data, the navigation list file being separate from the map file and stream files.

29. The method of claim 28, wherein the indicator of the first navigation data item has a value of the number of maps referenced by the first navigation data item.

* * * * *